United States Patent
Terasawa et al.

[11] Patent Number: 6,147,707
[45] Date of Patent: *Nov. 14, 2000

[54] METHOD AND APPARATUS FOR GAIN ADJUSTMENT OF AN IMAGE SENSOR

[75] Inventors: Ken Terasawa; Yuichiro Hattori, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/791,570

[22] Filed: Jan. 31, 1997

[30] Foreign Application Priority Data

| Feb. 6, 1996 | [JP] | Japan | ................................. 8-020203 |
| May 31, 1996 | [JP] | Japan | ................................. 8-138338 |
| Jun. 7, 1996 | [JP] | Japan | ................................. 8-145813 |

[51] Int. Cl.[7] .............................. H04N 9/68; H04N 5/235
[52] U.S. Cl. ........................................... 348/229; 348/234
[58] Field of Search ..................... 348/222, 229, 348/234, 235, 237, 223, 224, 320, 321, 257, 280, 262

[56] References Cited

U.S. PATENT DOCUMENTS

| 4,525,741 | 6/1985 | Chahal et al. | ............................ 348/257 |
| 4,751,567 | 6/1988 | Hashimoto | ............................... 348/224 |
| 4,814,861 | 3/1989 | Hieda | ....................................... 348/234 |
| 4,825,293 | 4/1989 | Kobayashi et al. | ...................... 348/234 |
| 4,827,331 | 5/1989 | Nakamura et al. | ...................... 348/223 |
| 5,283,655 | 2/1994 | Usami | ..................................... 348/229 |
| 5,325,185 | 6/1994 | Tsuchwa | ................................. 348/223 |
| 5,337,152 | 8/1994 | Kotaki | .................................... 348/234 |
| 5,570,129 | 10/1996 | Häfele et al. | ............................ 348/223 |
| 5,579,049 | 11/1996 | Shimaya et al. | ........................ 348/229 |
| 5,633,677 | 5/1997 | Okino et al. | ............................. 348/229 |
| 5,668,597 | 9/1997 | Parulski et al. | .......................... 348/321 |
| 5,671,015 | 9/1997 | Yagi | ....................................... 348/257 |
| 5,737,015 | 4/1998 | Juen | ....................................... 348/321 |

*Primary Examiner*—Wendy Garber
*Assistant Examiner*—Alicia M. Harrington
*Attorney, Agent, or Firm*—Morgan & Finnegan, LLP

[57] ABSTRACT

Image signals of all the pixels of a non-interlace scanning type image sensing device are sequentially outputted by a plurality of output terminals in one field period, the outputted image signals are amplified by a plurality of amplifiers each of which is provided for each of the output terminal, then the amplified signal levels of the image signals are detected by a detector. Gains to be used in the plurality of amplifiers are corrected on the basis of the signal levels detected by the detector and correction data for correcting difference in signal level of the image signals amplified by identical gains by the plurality of amplifiers, thereby correcting a variation in characteristics of the plurality of amplifiers.

11 Claims, 18 Drawing Sheets

| line 1 | R | G | R | G | R |
|--------|---|---|---|---|---|
| line 2 | G | B | G | B | G |
| line 3 | R | G | R | G | R |
| line 4 | G | B | G | B | G |
|        | R | G | R | G | R |

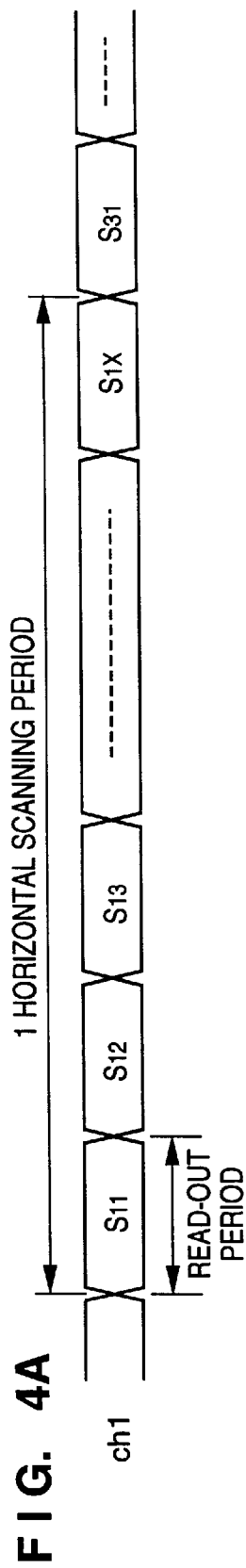

fs : SAMPLING FREQUENCY IN THE HORIZONTAL DIRECTION

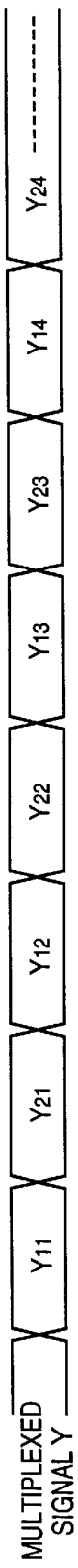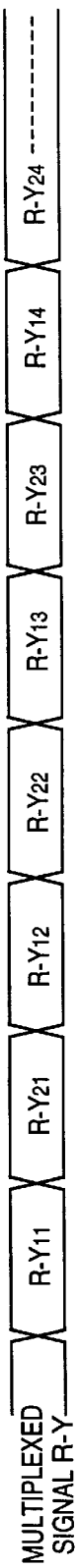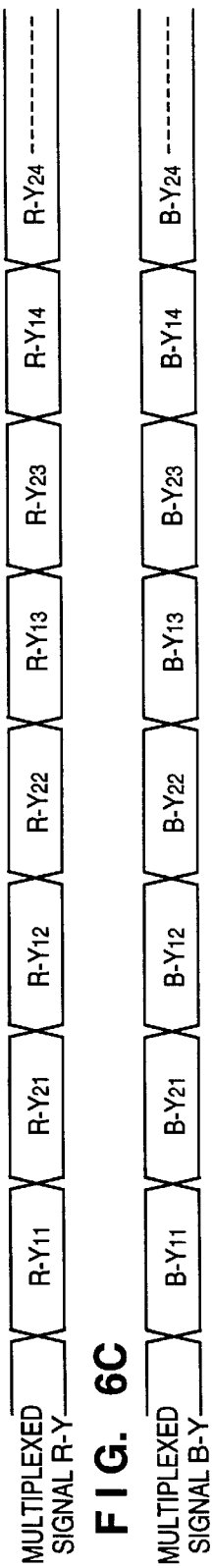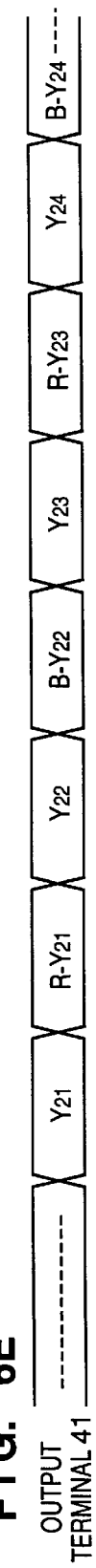

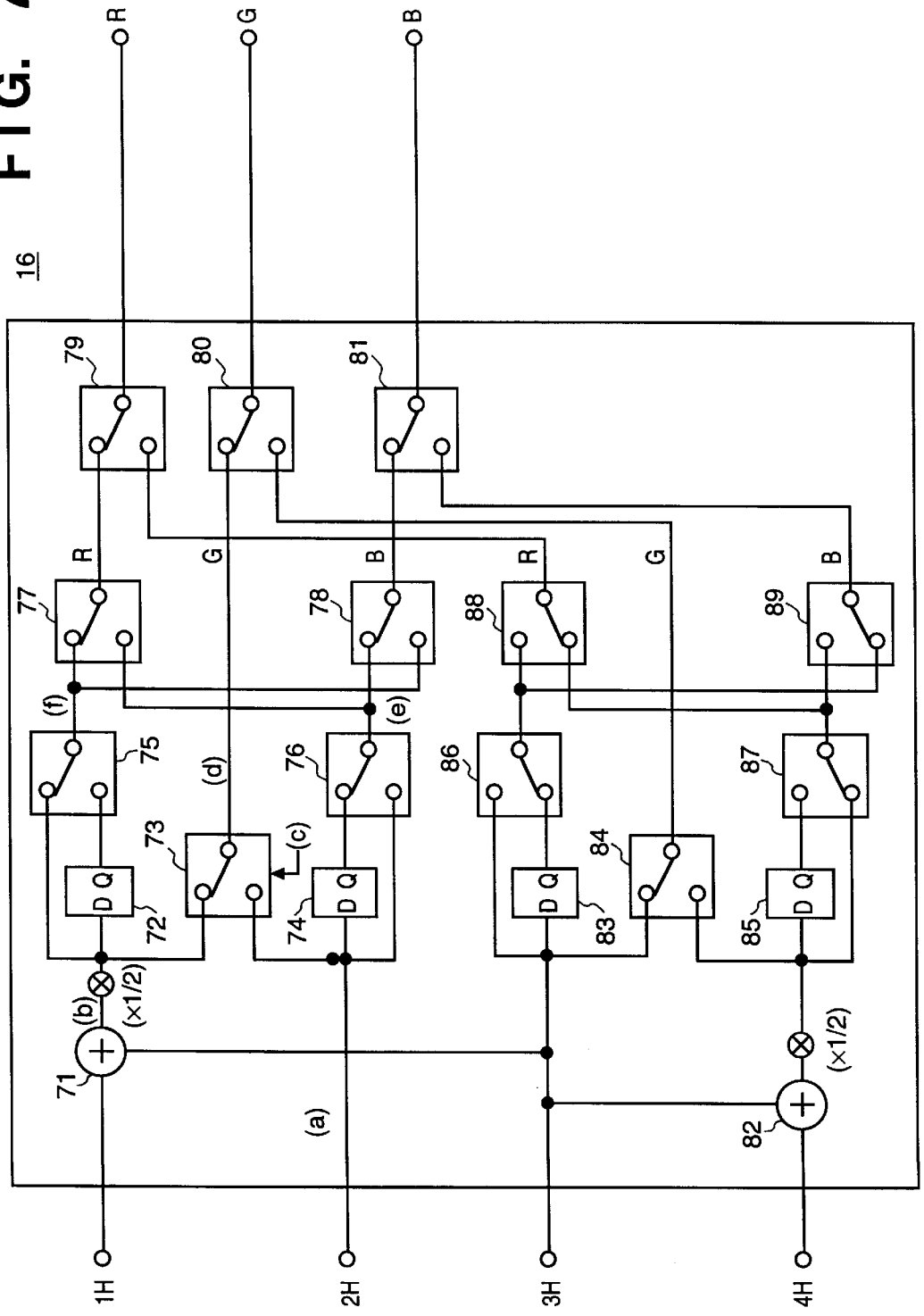

FIG. 8A SIGNAL (a) 
FIG. 8B SIGNAL (b) 
FIG. 8C SIGNAL (c) 
FIG. 8D SIGNAL (d) 
FIG. 8E SIGNAL (e) 
FIG. 8F SIGNAL (f) 

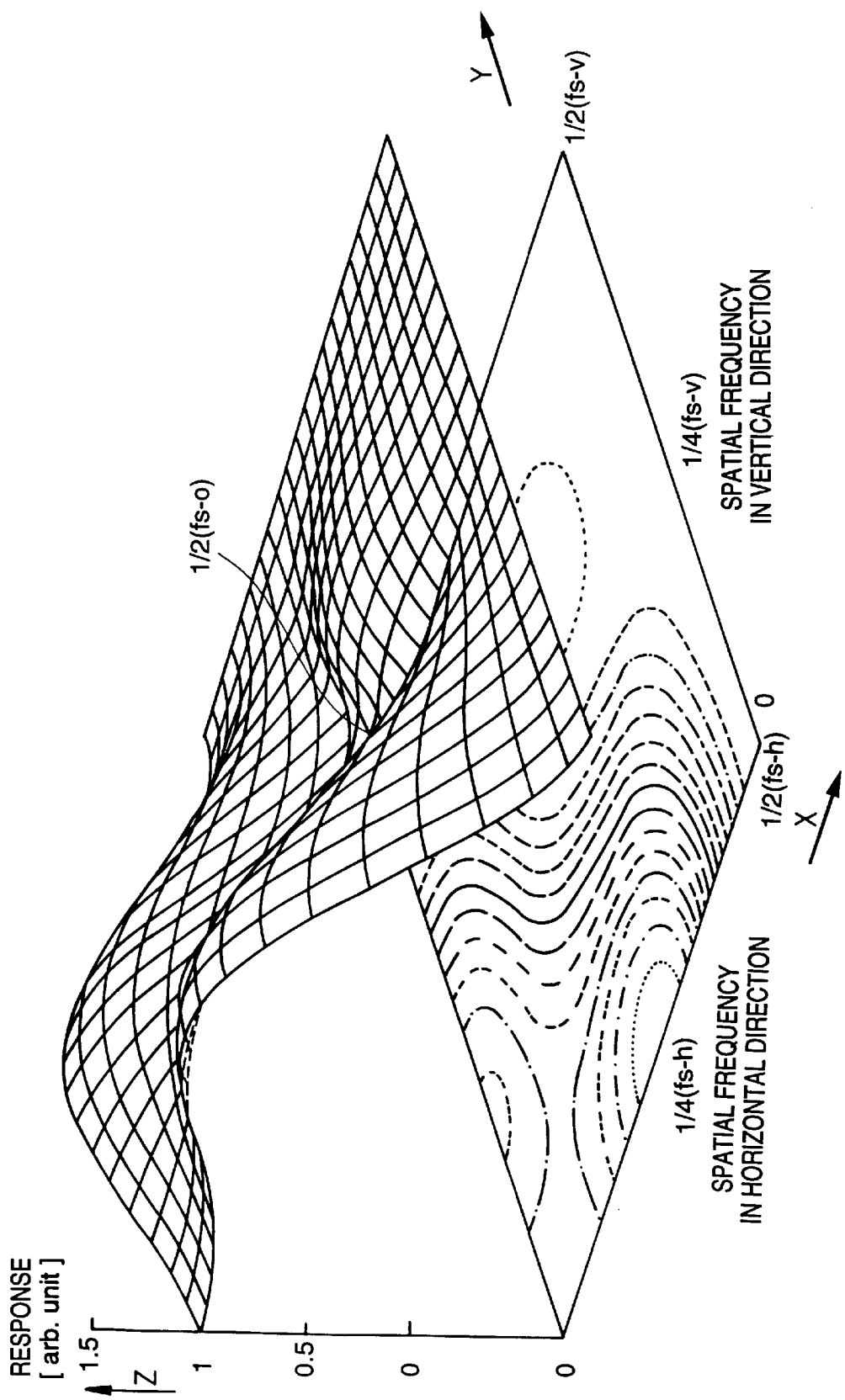

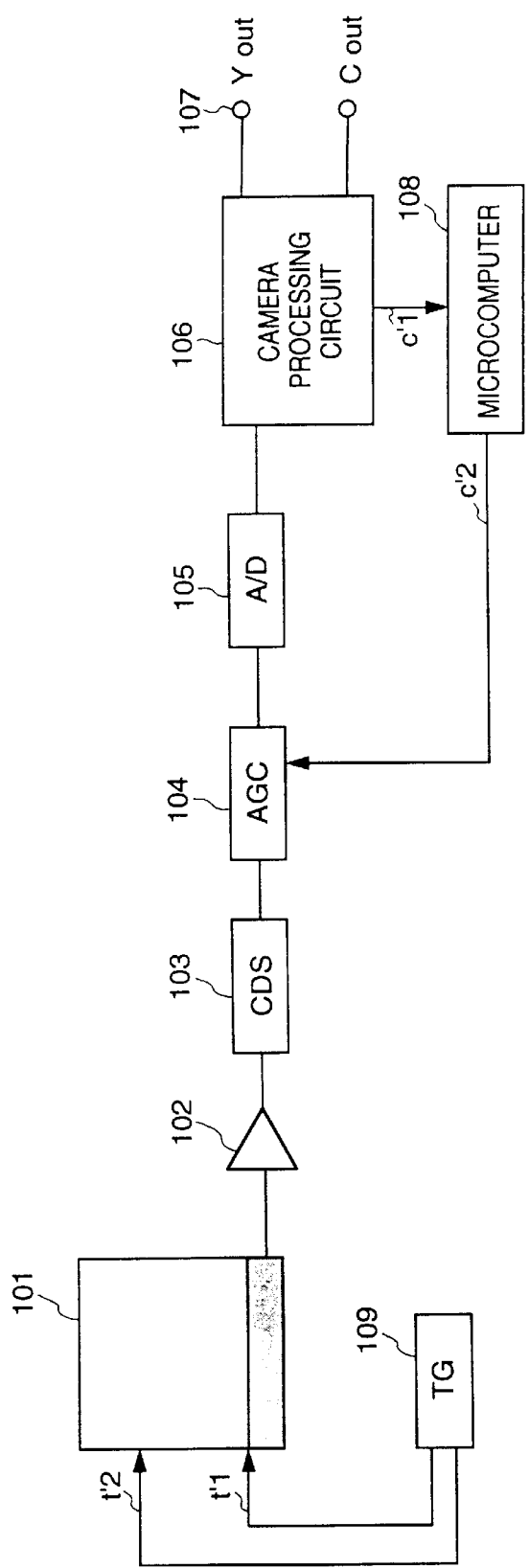

-- PRIOR ART --

| GAIN CONTROL VALUE | CORRECTION DATA |
|---|---|
| 0 | 0 |
| 1 | +2 |
| 2 | −1 |
| ⋮ | ⋮ |
| 1023 | +24 |

METHOD AND APPARATUS FOR GAIN ADJUSTMENT OF AN IMAGE SENSOR

BACKGROUND OF THE INVENTION

The present invention relates to an image sensing apparatus suitable for using a sequential scanning type solid-state image sensing device covered with a color filter of so-called Bayer arrangement and the like.

Recently, an image sensing device, such as CCD, capable of sequentially reading signals of all the pixels (referred as "non-interlace scanning type image sensing device", hereinafter) has been developed with the progress of semiconductor manufacturing technique. The non-interlace scanning type image sensing device has an advantage in that a higher resolution image can be obtained with less blurring than an image sensed by using a conventional interlace scanning type image sensing device even when sensing a moving object. In the interlace scanning type image sensing device, a frame image is composed of two field images which are sensed at different times, usually at a field period interval. Accordingly, there is a problem in which, when sensing a moving object, there are notches on edges of the object and perhaps in the background in a frame image because of the time gap between the two field images composing the frame image. If a frame image is made of image data of a single field image to overcome the aforesaid problem, there would not be notches on edges, however, the vertical resolution of the obtained frame image is halved.

A conventional image sensing apparatus using an image sensing device which outputs signals after adding two vertically adjacent pixel charges will be explained with reference to FIG. 16. Referring to FIG. 16, an image sensing device 101 outputs signals after adding two vertically adjacent pixel charges in accordance with timing signals t'1 and t'2 generated by a timing signal generator (TG) 109. The output image signals are inputted to a correlated double sampling (CDS) circuit 103 via a buffer 102, and reset noises of the image sensing device 101 are removed from the output image signals by the CDS circuit 103, then the image signals enter an automatic gain controller (AGC) 104. In the AGC 104, the image signals are amplified by a gain set in accordance with a control signal c'2 from a microcomputer 108 (gain control). The gain-controlled image signals are converted into digital signals by an analog-digital (A/D) converter 105, then transmitted to a camera processing circuit 106, where predetermined processes are applied to the digital image signals, and a luminance signal Y and a color difference signal C are outputted. Further, the microcomputer 108 generates a control signal c'2 for controlling the gain in the AGC 104 in accordance with the gain information c'1 detected by a camera processing circuit 106.

In contrast, with a non-interlace scanning type image sensing device, it is possible to sense a frame image in a field period, thus, the aforesaid problems do not arise. Accordingly, the non-interlace scanning type image sensing device is expected to be applied to a still image camera and a camera for EDTVII (Extended Definition Television II), for example.

A circuit configuration of an image sensing apparatus using the conventional non-interlace scanning type image sensing device which reads out signals by two horizontal lines will be explained with reference to FIG. 17. A non-interlace scanning type image sensing device 201p outputs image data of one frame in a field period, thus the speed for transferring charges is two times faster than the transferring speed of an image sensing device, as shown in FIG. 16, which outputs image signals obtained by adding two vertically adjacent pixel charges. Accordingly, it is preferred to design an image sensing device to have two horizontal registers which respectively transfer image signals of odd and even scan lines simultaneously to be first and second output signals, instead of transferring by one line through a single horizontal register.

It should be noted that most of the non-interlace scanning type image sensing devices used at the present time are provided with R, G and B filter chips arranged in so-called Bayer arrangement as shown in FIG. 2. In this color arrangement, G signal is used as a luminance signal.

The non-interlace scanning type image sensing device 201p transfers charges via vertical registers and horizontal registers in accordance with timing signals t1p and t2p generated by TG 209p, and signals on the odd lines and the even lines are outputted from the channels ch1 and ch2 in each field period. The output signals from the channels ch1 and ch2 are respectively sent to buffers 221 and 222, then to CDS circuits 231 and 232. The CDS circuits 231 and 232 remove reset noises of the image sensing device 201p, then transmits image signals to AGCs 241 and 242. The AGCs 241 and 242 amplify the image signals by gains which are designated by the camera processing circuit 206p. A/D converters 251 and 252 convert the analog image signals into digital signals, then transmits them to the camera processing circuit 206p.

Among the digital image signals inputted to the camera processing circuit 206p, it interpolates the G signal, used as a luminance signal, in the horizontal direction as shown in FIG. 18A so that all the pixels have the luminance data. Thereafter, gain information c1p obtained on the basis of the G signal is sent to a microcomputer 208p. The microcomputer 208p determines gains to be used in the AGCs 241 and 242 on the basis of the data received from the camera processing circuit 206p, then sends a control signal c2p.

The AGCs change gains to be applied to image signals in accordance with the control signal c2p, and the two AGCs have different characteristics from each other in general. Therefore, even though the same gain is provided to the two AGCs, the levels of amplified image signals may differ from each other. If this occurs, when an object of a uniform color (e.g., a white paper) is sensed, a variation in output signal level of the two AGCs appears in a stripe pattern of odd and even scan lines as shown in FIG. 18B. Therefore, when an image of the object is displayed, the variation in output signal level appears as the difference in output signal level between odd and even line fields on a display, which causes field flicker. This noticeably deteriorates the quality of the image.

To overcome this problem, a method for interpolating an average of pixel values of the G signals in a vertical row as shown in FIG. 19A can be considered. However, in this method, when an object of a uniform color (e.g., a white paper) is sensed, a variation in output signal level of the two AGCs may cause vertical stripes which alternatively have different output levels on a display as shown in FIG. 19B. The difference in output level in the vertical stripes also noticeably deteriorates the quality of an image.

Further, in order to compensate a variation in output signal level of the two AGCs, the following method may be considered. First, the TG 209p sends a timing signal t3p to a test signal generator 210p at a predetermined timing. The test signal generator 210p inputs a test signal to the two horizontal registers ch1 and ch2 of the image sensing device at a timing in accordance with the timing signal t3p. The test signals outputted from the two horizontal registers are processed in the same manner of processing image signals. Then, the difference in output level between the two AGCs is detected and the microcomputer 208p sends gain information c2p to the AGCs 251 and 252 based on the gain information c1p which shows gain difference between the test signals. Further, the microcomputer 208p outputs a signal d1 which instructs to start the next test to the test signal generator 210p, in turn, a test signal is inputted to the horizontal registers again and processed in the same manner of processing image signals so as to confirm that the difference in output level between two AGCs are corrected.

However, in the configuration shown in FIG. 17, means for generating a test signal used for correcting levels of signals output from the two AGC circuits, increases the size of the apparatus. Further, since it is necessary to confirm that the output signals from the AGCs are successfully corrected, it consumes a considerable time for the confirmation.

SUMMARY OF THE INVENTION

The present invention has been made in consideration of the above situation, and has as its object to provide an image sensing apparatus having a smaller circuit configuration and an image sensing method which are capable of shortening time for effectively compensating a variation in output signal level of the two AGCs.

According to the present invention, the foregoing object is attained by providing an image sensing apparatus comprising: an image sensing device having a plurality of output terminals and sequentially outputs image signals of all the pixels of the image sensing device from the plurality of output terminals; a plurality of amplification means for amplifying the image signals outputted from the plurality of output terminals; memory means for storing correction data for correcting difference in signal level of the image signals amplified by the plurality of amplification means when identical gains are used in the plurality of amplification means; detection means for detecting the signal levels of the image signals amplified by the plurality of amplification means; and control means for determining gains to be used in the plurality of amplification means on the basis of the signal levels detected by the detection means and the correction data stored in the memory means, and outputting the determined gains to the plurality of amplification means.

According to the present invention, the foregoing object is also attained by providing an image sensing method comprising: an image signal output step of sequentially outputting image signals of all pixels of an image sensing device from a plurality of output terminals; an amplification step of amplifying the image signals outputted from the plurality of output terminals by using a plurality of amplification means; detection step of detecting the signal levels of the image signals amplified at the amplification step; and control step of determining gains to be used in the plurality of amplification means on the basis of the signal levels detected at the detection step and correction data for correcting difference in signal level of the image signals amplified by identical gains, and outputting the determined gains.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C time chart showing a time-division multiplexing operation;

FIGS. 6A to 6G are time charts showing formats of output signals from a processing circuit shown in FIG. 1;

FIG. 7 is a circuit showing a configuration of a color separator shown in FIG. 1;

FIG. 8A to 8F are time charts showing an operation of the color separator in FIG. 7;

FIG. 14 is a graph showing characteristics of a two-dimensional filter shown in FIG. 12;

FIGS. 15A to 15C are drawings for explaining the coefficients of two-dimensional filter;

FIG. 16 is a block diagram illustrating a configuration of a conventional image sensing apparatus which outputs image signals after adding signals of adjacent two vertical pixels;

DETAILED DESCRIPTION OF THE PREFERRED EMBODIMENTS

Preferred embodiments of the present invention will be described in detail in accordance with the accompanying drawings.

<First Embodiment>

Figure 1:
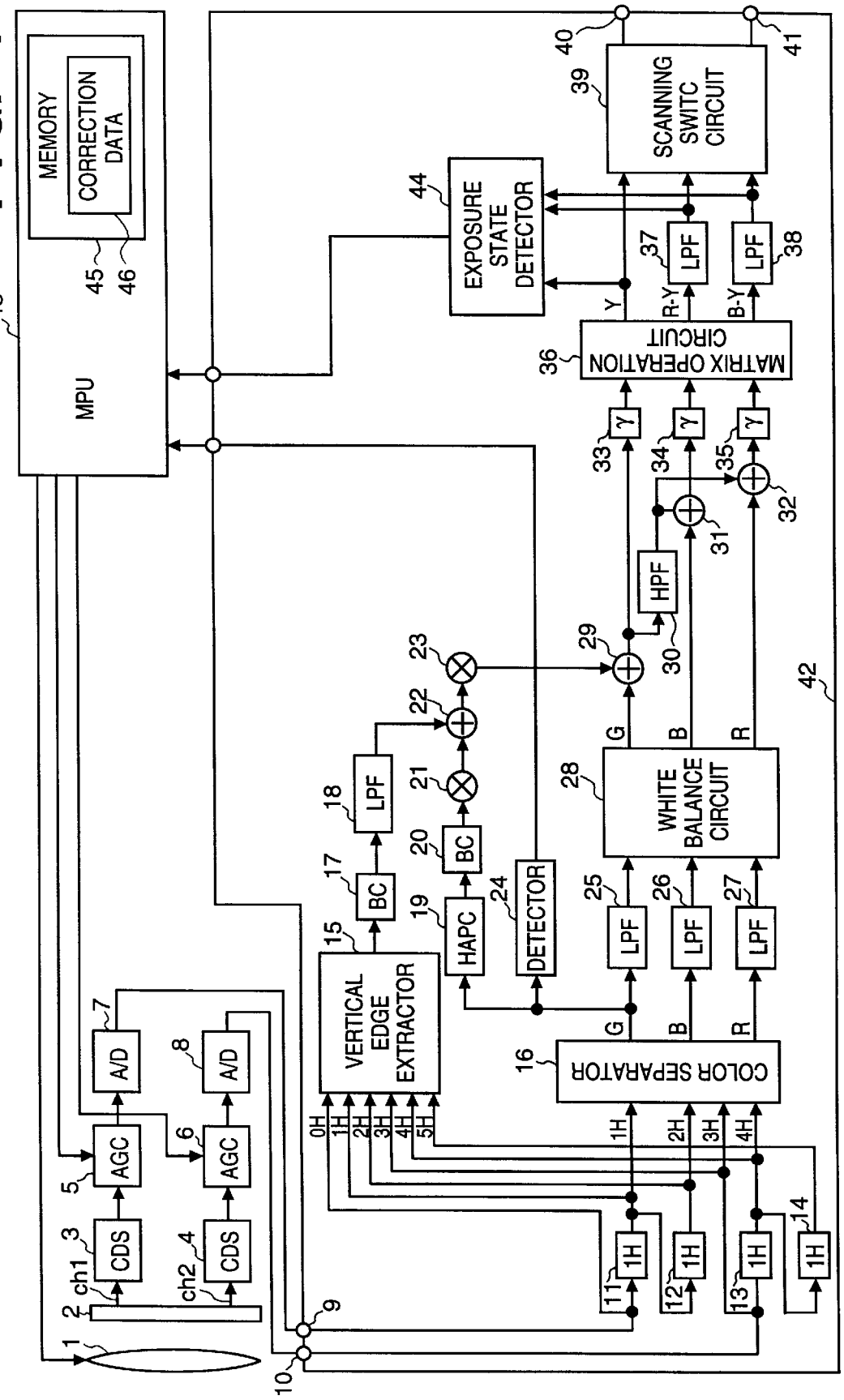
FIG. 1 is a block diagram illustrating a configuration of an image sensing apparatus according to a first embodiment of the present invention.

A first embodiment of the present invention will be explained with reference to FIG. 1. In FIG. 1, reference numeral 1 denotes an optical system for forming an image of an object on an image sensing device; 2, a non-interlace scanning type CCD (simply referred as "CCD", hereinafter) as a solid-state image sensing device which reads out signals by sequential scanning; 3 and 4, correlated double sampling (CDS) circuits for reducing noises of output signals; 5 and 6, automatic gain controllers (AGCs) for amplifying the signals outputted from the CCD 2 to proper levels; and 7 and 8, analog-digital (A/D) converters for converting the signals outputted from the CCD 2 into digital signals.

Further, reference numeral 9 and 10 denote input terminals of a signal processing circuit 42; 11, 12, 13 and 14, line memories for delaying the signals from the CCD 2 for one scan line period; 15, a vertical edge extractor which extracts a vertical edge signal from signals of six scan lines synchronized by the line memories 11 to 14; 16, a color separator for generating G, B and R signals from signals of the six scan lines synchronized by the line memories 11 to 14; 17, a base-clipping circuit for slicing low amplitude components of the vertical edge signal; 18, a low-pass filter (LPF) for limiting the frequency range of the vertical edge signal; 19, a horizontal edge extractor for extracting a horizontal edge signal from the G signal; 20, a base-clipping circuit for slicing low amplitude components of the horizontal edge signal; 21, a gain controller for controlling the gain of the horizontal edge signal; 22, an adder for adding the horizontal edge signal and the vertical edge signal; and 23, a gain controller for controlling the gain of the edge signal.

Reference numeral 24 denotes a detector for detecting frequency components having a frequency of half the sampling frequency from the G signal; 25, 26 and 27, low-pass filters (LPFs) for limiting frequency ranges of the G, B and R signals; 28, a white balance circuit for adjusting white balance; 29, an adder for adding the edge signal to the G signal; 30, a high-pass filter (HPF) for extracting high frequency components of the G signal; 31 and 32, adders for adding the high frequency components of the G signal extracted by the HPF 30 to the R and B signals; and 33, 34 and 35, γ correction circuits.

Furthermore, reference numeral 36 denotes a matrix operation circuit for generating a luminance signal Y and color difference signals R-Y and B-Y on the basis of the primary color signals; 37 and 38, low-pass filters (LPFs) for limiting frequency ranges of the color difference signals; 39, a scanning switch circuit; 40 and 41, output terminals of the signal processing circuit 42; 42, the signal processing circuit for processing signals from the CCD 2; 43, a micro processing unit (MPU) for controlling gains used by the AGCs 5 and 6; 44, an exposure state detector for generating exposure information indicating a state of the exposure of the CCD 2 from the Y, R-Y, and B-Y signals; and 45, a memory.

Next, operation of the image sensing apparatus having the aforesaid configuration will be described below.

Figures 2, 3:
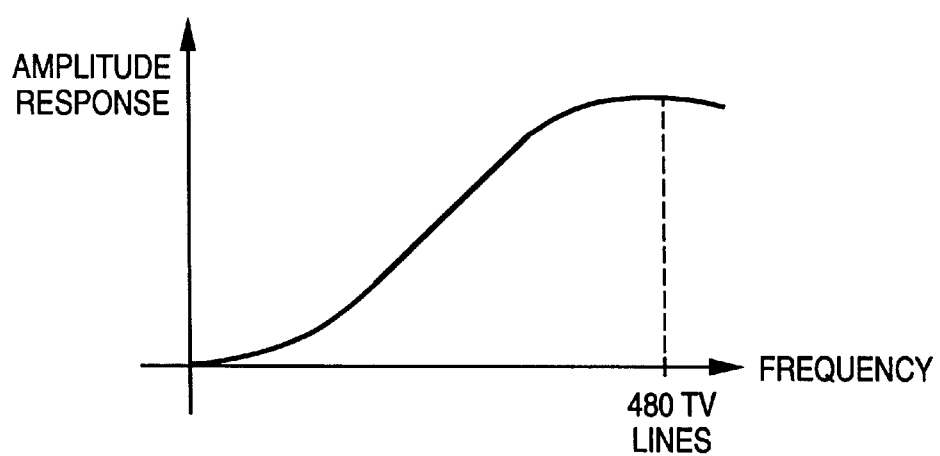
FIG. 2 shows an example of an arrangement of a color filter.
FIG. 3 is a graph showing characteristics of a vertical edge enhancing circuit.

Incoming light reflected by an object passes through the optical system 1 and incidents on the image sensing surface of the CCD 2, then converted into electrical signals. A color filter is provided on the CCD 2 for sensing a color image. The color filter array has color filter chips arranged in so-called Bayer arrangement as shown in FIG. 2.

The converted electrical signals are transferred through vertical registers and horizontal registers in accordance with a timing signal generated by a timing generator (not shown), and outputted from two output terminals (channels ch1 and ch2) of the CCD 2 of two scan lines in parallel. More specifically, signals of odd scan lines are outputted from one terminal, and signals of even scan lines are outputted from the other terminal. The signals outputted from the channels ch1 and ch2 of the CCD 2 are respectively processed by the CDS circuits 3 and 4 and the AGCs 5 and 6, then converted into digital signals by the A/D converters 7 and 8. The signals of two scan lines outputted from the A/D converters 7 and 8 are input to the signal processing circuit 42 via the input terminals 9 and 10, and the line memories 11 to 14 synchronize signals of six scan lines.

The signals of the six scan lines are inputted into the vertical edge extractor 15 where a vertical edge signal is extracted. The edge extractor 15 comprises a high-pass filter in the vertical direction. In a case where the CCD 2 has 640×480 pixels, the high pass filter has the transmission characteristics as shown in FIG. 3. The vertical edge signals of two scan lines extracted by the vertical edge extractor 15 are converted into a dot sequential signal having a two times higher frequency than the sampling frequency of the CCD 2 in order to reduce the size of subsequent circuits. More specifically, signals respectively corresponding to an odd scan line and an even scan line are converted into a dot-sequential signal multiplexed in time-division as shown in FIGS. 4A to 4C. The dot-sequential vertical edge signal is inputted to the base-clipping circuit 17 where the low amplitude components are sliced for reducing noises, then unnecessary frequency range in the horizontal direction is removed from the vertical edge signal by the LPF 18.

Meanwhile, the signals of six scan lines which are synchronized by the line memories 11 to 14 are separated into G, B and R signals in accordance with a timing signal generated by a timing signal generator (not shown). The G, B and R signals are also in a form where signals of two scan lines are multiplexed in time division. The frequency ranges of the extracted signals are respectively limited to appropriate ranges by the LPFs 25 to 27.

Figure 5A:
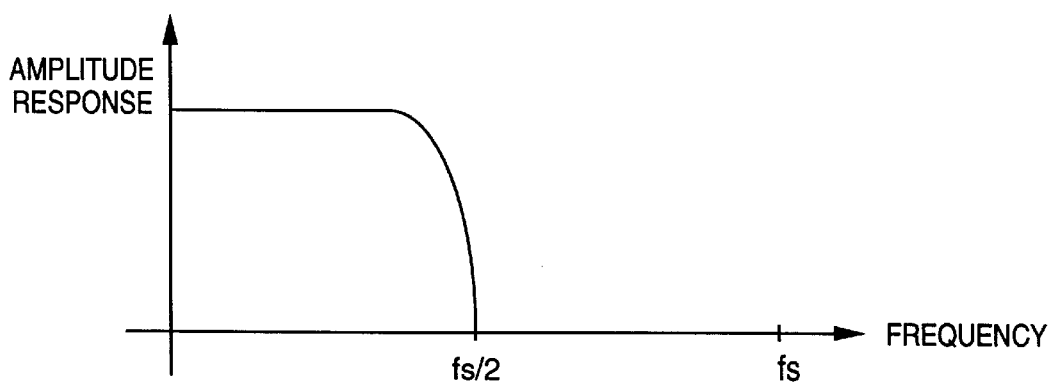
FIGS. 5A and 5B are graphs showing characteristics of a low-pass filter.
Figure 5B:
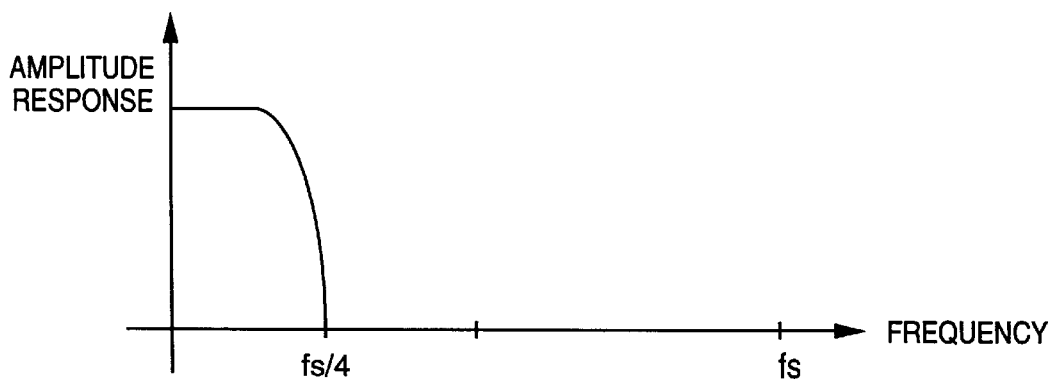

For example, if the provided color filter is of Bayer arrangement as shown in FIG. 2, since the sampling points of G signal exist in every line, the horizontal frequency range of the G signal is ½ of the horizontal sampling frequency of the CCD 2 or less. Therefore, the transmission range of the LPF 25 is set to a frequency which is about ½ of the sampling frequency of the CCD 2 or less. Further, the sampling points of R and B signals exist in every other lines, thus the horizontal frequency ranges the R and B signals are ½ of the horizontal frequency of the G signal. Accordingly, the transmission range of the LPFs 26 and 27 is set to a frequency which is about ¼ of the sampling frequency of the CCD 2 or less. An example of transmission characteristics of the LPF 25 is shown in FIG. 5A, and an example of transmission characteristics of the LPFs 26 and 27 is shown in FIG. 5B.

At the same time, the separated G signal is inputted to the horizontal edge extractor 19 where a horizontal edge signal is extracted. The extracted horizontal edge signal is processed by the base-clipping circuit 20 and the gain controller 21, then added to the aforesaid vertical edge signal by the adder 22. The added edge signal is adjusted to an appropriate signal level by the gain controller 23, then further added to the G signal by the adder 29.

Meanwhile, the signal level of the G signal having a ½ sampling frequency detected by the detector 24 is inputted to the MPU 43 for detecting amplification characteristic differences between the AGCs 5 and 6. Further, gains for R and B signals are changed by the white balance circuit 128 to match the levels of the G, B and R signals at a white portion. Next, high frequency components of the G signal are extracted by the HPF 30, and added to the B and R signals by the adders 31 and 32, respectively. The transmission characteristics of the HPF 30 are complementary to the LPFs 26 and 27 so that all of the G, B and R signals have the same spatial frequency range.

Thereafter, the R, B and G signals are applied with γ correction by the γ correction circuits 33, 34 and 35, then converted into a luminance signal Y and color difference signals R-Y and B-Y in the matrix operation circuit 36. The bandwidth of the color difference signals R-Y and B-Y is limited to about ½ of the bandwidth of the luminance signal Y by the LPFs 37 and 38. Then, the luminance signal Y and the color difference signals R-Y and B-Y are inputted to the exposure state detector 44 where exposure information is extracted. The detected exposure information is transferred to the MPU 43 where an aperture diaphragm of the optical system 1 and gains to be used in the AGCs 5 and 6 are controlled so that luminous exposure becomes appropriate for the brightness of an object.

Finally, the luminance signal Y and the color difference signals R-Y and B-Y are inputted to the scanning switch circuit 39. The scanning switch circuit 39 switches the input Y, R-Y and B-Y signals in accordance with a switch pulse generated by a timing signal generator (not shown), and generates video signals of two lines which are respectively obtained by multiplexing Y, R-Y and B-Y signals of each scan line in time division. For example, for Y signals of two pixels, R-Y signal of one pixel and B-Y signal of one pixel are selected, and these signals are multiplexed in the order of Y, R-Y, Y, B-Y, and so on, in time division. It should be noted that the Y, R-Y and B-Y signals to be multiplexed have to be in the same scan line. Timing of this operation is shown in FIGS. 6A to 6G. At this time, the time interval between clocks for output signal is two times longer than that of the sampling rate of Y signal.

As for the luminance signal outputted from the matrix operation circuit 36, luminance signals of two scan lines are multiplexed by pixel in time division by the matrix operation circuit 36 and inputted to the scanning switch circuit 39 as shown in FIG. 6A. Similarly, the color difference signals R-Y and B-Y inputted to the scanning switch circuit 39 from the matrix operation circuit 36 through the LPFs 37 and 38 are also multiplexed signals of color difference signals of two scan lines in time division as shown in FIGS. 6B and 6C. The scanning switch circuit 39 obtains two lines of video signals on the basis of the input multiplexed luminance signal Y and the input multiplexed color difference signals R-Y and B-Y. Here, the video signal of each line is a time-division multiplexed video signal as shown in FIGS. 6D and 6E. Therefore, as shown in FIGS. 6F and 6G, signals of odd scan lines are outputted from one output terminal (e.g., the output terminal 40) and signals of even scan lines are outputted from the other terminal (e.g., the output terminal 41) in a given field period. Accordingly, it is possible to display an image in non-interlace by using the signals outputted from both of the output terminals 40 and 41. Further, as shown in FIGS. 6F and 6G, a signal of odd scan lines or even scan lines is alternatively outputted from the output terminals 40 and 41. Thus, a signal suitable for an interlace display can be obtained by using the signal output from either the output terminal 40 or the output terminal 41. In other words, when the signal from one of the two output terminals 40 and 41 is used, the obtained signal corresponds to an interlaced signal, and when the signals from both of the two output terminals are used, then the obtained signal corresponds to a non-interlace signal.

FIG. 7 is a block diagram illustrating a detailed configuration of the color separator 16. Further, FIGS. 8A to 8F show an operation of the color separator. Signals shown in FIG. 8A to 8F corresponds to signals shown in FIG. 7.

The color separator 16 separates G, B and R signals corresponding to one scan line by using signals of three scan lines among signals of four input scan lines. The phase of the sampling frequency of the G signal in a given scan line differ from that in the upper and lower scan lines by a phase shift of π. Therefore, by alternatively taking a signal in the central scan line of the three scan lines and an average of the signals of the upper and lower scan lines, it is possible to obtain a G signal having the same frequency as the sampling frequency of the CCD 2. FIG. 8A shows an example of a signal (a) in the central scan line, and FIG. 8B shows an average (b) of signals of the upper and lower scan lines with respect to the central scan line. By selecting these signals alternatively by a switch 73 at a timing shown in FIG. 8C, a G signal (d) shown in FIG. 8D is obtained. The above explanation is based on signals of three scan lines. A G signal is separated in a similar manner when signals of four scan lines are used.

Further, R and B signals have a frequency which is 50% lower than the sampling frequency of the CCD 2 and appear in every other scan line. Therefore, the signal in the central scan line (in the case shown in FIG. 8A, R signal) and the signal of an average of the signals of the upper and lower scan lines with respect to the central scan line (in this case B signal) are respectively processed with sample-and-hold operation at a frequency which is 50% lower than the sampling frequency of the CCD 2. More specifically, signals (a) and (b) in FIG. 7 are processed with sample-and-hold by D-type flip flops 72 and 74 and switches 75 and 76 which alternatively select one of two signals inputted to the switches 75 and 76, thereby signals (e) and (f) shown in FIGS. 8E and 8F are obtained. R and B signals are separated in a similar manner when signals of four scan lines are used.

Regarding the AGCs 5 and 6, gains to be used in the AGCs 5 and 6 are controlled by the MPU 43 so that amplified levels of image signals by the AGCs 5 and 6 are appropriate. However, as described above, since there usually are differences in amplifying characteristics between the AGCs 5 and 6, signal levels outputted from the AGCs 5 and 6 differ from each other when the same gain is applied to signals of the same level. If the color separation is performed on the image signals under this situation in the aforesaid method, noise of two-dot period appears as vertical stripes in a G signal as apparent from FIG. 8D, which greatly deteriorates the image quality.

To overcome the aforesaid problem, data representing difference in amplifying characteristics (correction data 46) between the AGCs 5 and 6 is stored n the memory 45 in the MPU 43, in advance, then the MPU 43 corrects the difference in gains to be given to the GCs 5 and 6 by using the stored data and outputs the corrected gains to the AGCs 5 and 6.

Next, an example of correcting of gains will be explained referring to FIGS. 21 and 22.

Figures 21, 22:
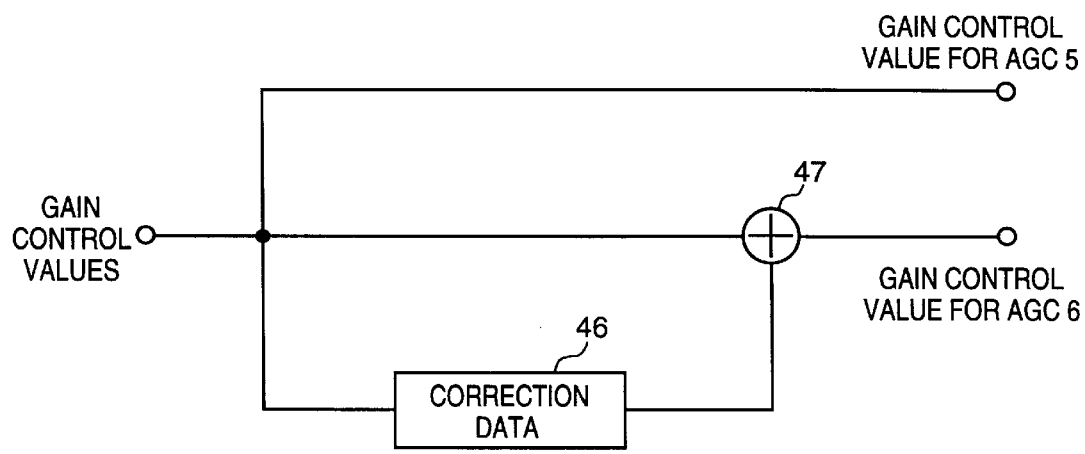
FIG. 21 is an explanatory view showing an example of determining gain control values for the AGCS.
FIG. 22 is a table of control values and the correction data.

FIG. 21 is an explanatory view showing an example of determining gain control values, which indirectly indicate gains, for the AGCs 5 and 6 performed in the MPU 43, and FIG. 22 is a table of control values and the correction data. In the MPU 43, the gain control value for the AGCs 5 and 6 are determined in a known manner, and the gain control value for one of the AGCs 5 and 6 (the AGC 5 in FIG. 21) is directly outputted. Regarding the gain control value for the other AGC (the AGC 6 in FIG. 21), first, correction data corresponding to the gain control value is obtained by referring to the correction data table shown in FIG. 22. Thereafter, the obtained correction data is added to the gain control value by an adder 47, and the corrected gain control value is outputted. Note, the correction data table is not limited to the one shown in FIG. 22, and various types of tables may be used. For example, a table may show the gain control values and corrected gain control values. In this case, the data obtained from the table is directly outputted and the adder 47 can be omitted.

By correcting gains to be given to the AGCs 5 and 6 by using the correction data as described above, it is possible to automatically correct a variation in characteristics of the AGCs 5 and 6 without using a special circuit.

The correction data 46 is made when tuning up the image sensing apparatus for the first time (e.g., when manufacturing an image sensing apparatus in a factory) and stored in the memory 45. As for making the correction data, an object of a uniform color is sensed, first, then the amount of frequency components of two dot period is detected by the detector 24, thereby obtaining the difference in amplifying characteristics between the AGCs 5 and 6.

<Second Embodiment>

Figure 9:
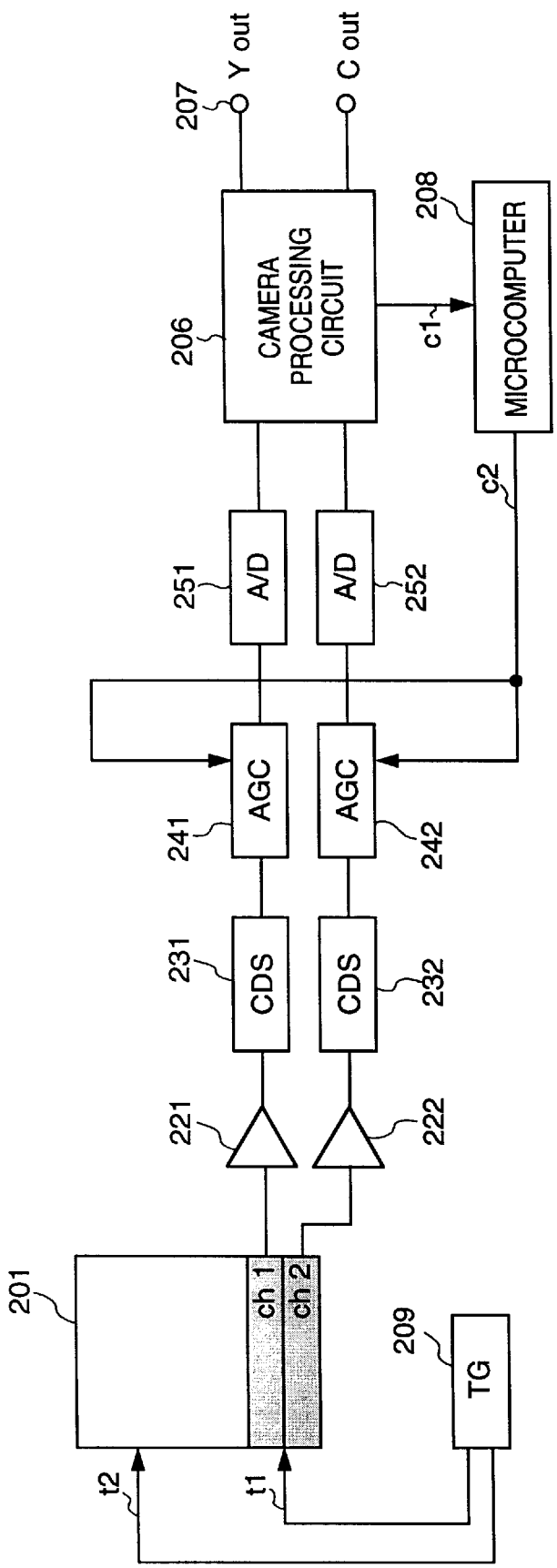
FIG. 9 is a block diagram illustrating a configuration of an image sensing apparatus according to a second embodiment of the present invention.
Figure 10:
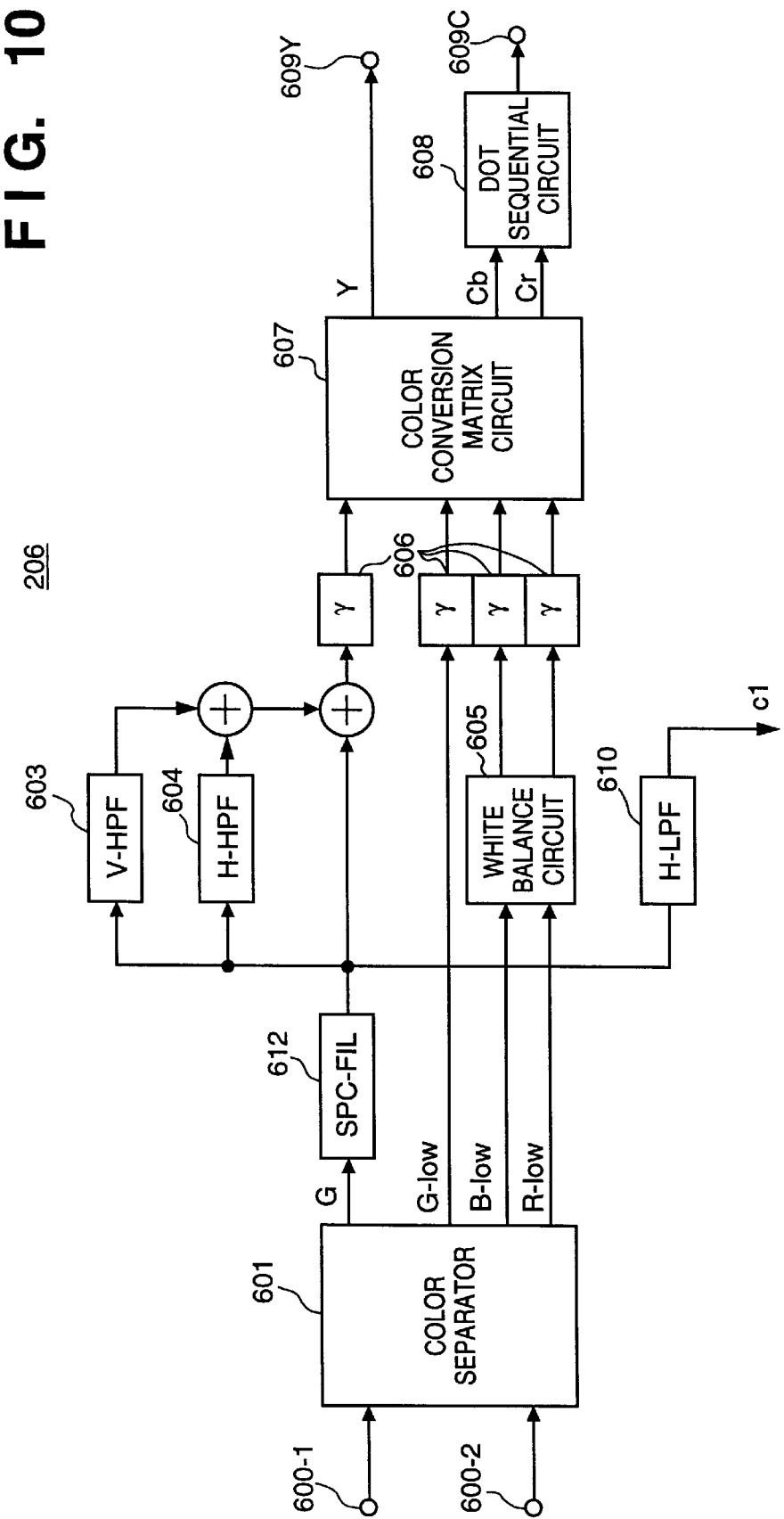
FIG. 10 is a block diagram illustrating a configuration of a camera processing circuit shown in FIG. 9.

FIG. 9 is a block diagram illustrating a configuration of an image sensing apparatus according to a second embodiment of the present invention, and FIG. 10 is a block diagram illustrating a configuration of a camera processing circuit 206 shown in FIG. 9.

Figure 17:
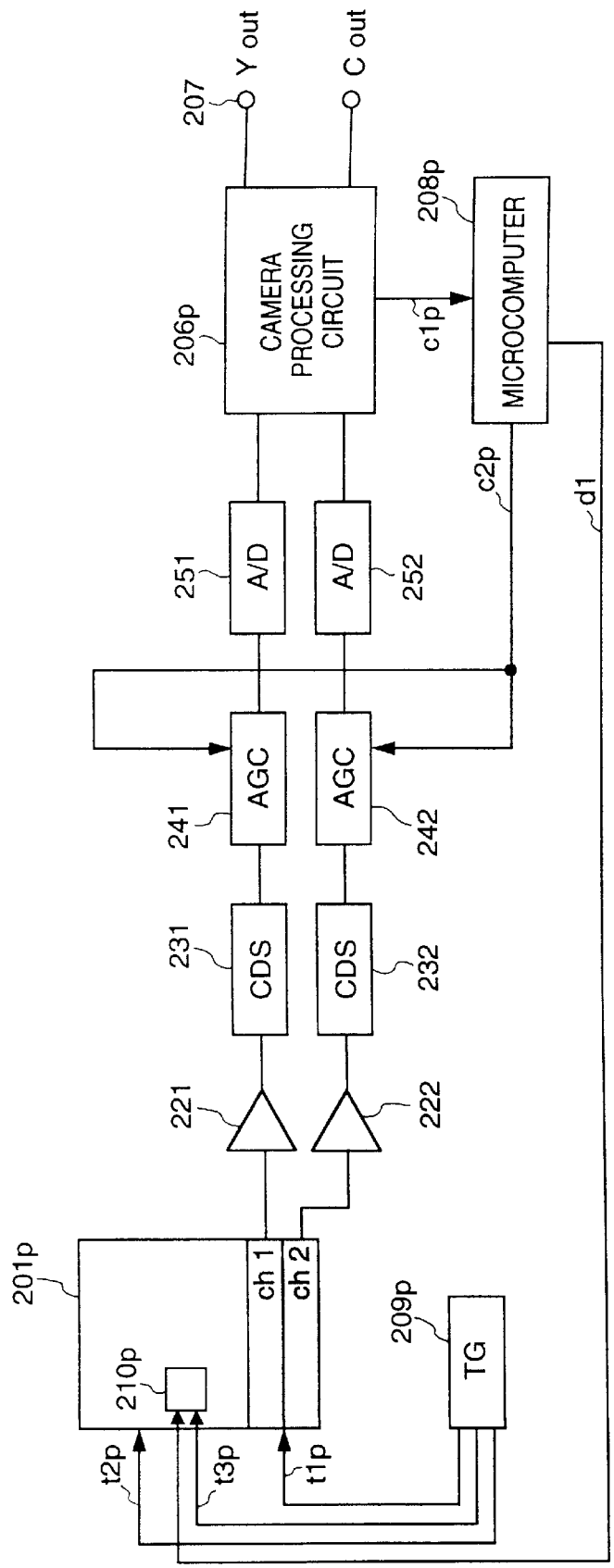
FIG. 17 is a block diagram illustrating a configuration of a conventional configuration of an image sensing apparatus which reads image signals by two scan lines.

In FIG. 9, the reference signal generator 210 (of FIG. 17) and lines which input to the reference signal generator 210 are removed from the configuration, and other units and elements are the same as those shown in FIG. 17.

Next, an operation of the image sensing apparatus will be explained.

Charges stored in the non-interlace scanning type image sensing device 201 are read out in accordance with the timing signal generated by the TG 209, then image signals are outputted from the channels ch1 and ch2 and inputted to the camera processing circuit 206 in the same manner as described above with reference to FIG. 17.

In the camera processing circuit 206 shown in FIG. 10, the image signals outputted from the channels ch1 and ch2 of the non-interlace scanning type image sensing device 201 are inputted to the camera processing circuit 206 through the input terminals 600-1 and 600-2, respectively. The color separator 601 generates signals G, G-low, B-low and R-low on the basis of data of G pixels, B pixels and R pixels sequentially inputted in accordance with the Bayer arrangement as shown in FIG. 2. When generating the G-low signal, values corresponding to non-G pixels are interpolated with averages of their upper and lower pixel data (average value interpolation in the vertical direction) so that every pixel has G value. Further, when generating the B-low signal, values corresponding to non-B pixels are interpolated with averages of their upper and lower and/or right and left B pixel data so that all the pixels have B values. For example, in a pixel arrangement as shown in FIG. 2, an pixel between two B pixels in the vertical direction is interpolated as an average of these two B pixel values, and an pixel between two B pixels in the horizontal direction is interpolated as an average of these two B pixel values. As for a pixel whose upper, lower, right and left pixels are not B pixels, an average of four B pixel values at the four corners is used to interpolate the pixel of interest. Further, for obtaining R-low signal, interpolation similarly to the one performed for obtaining the B-low signal is performed. Thereafter, these signals are rearranged dot-sequentially and outputted. Regarding the signals G, pixels which do not have data are interpolated in the vertical direction, i.e., with average values of the upper and lower pixels so that all the pixels have data.

Figure 11:
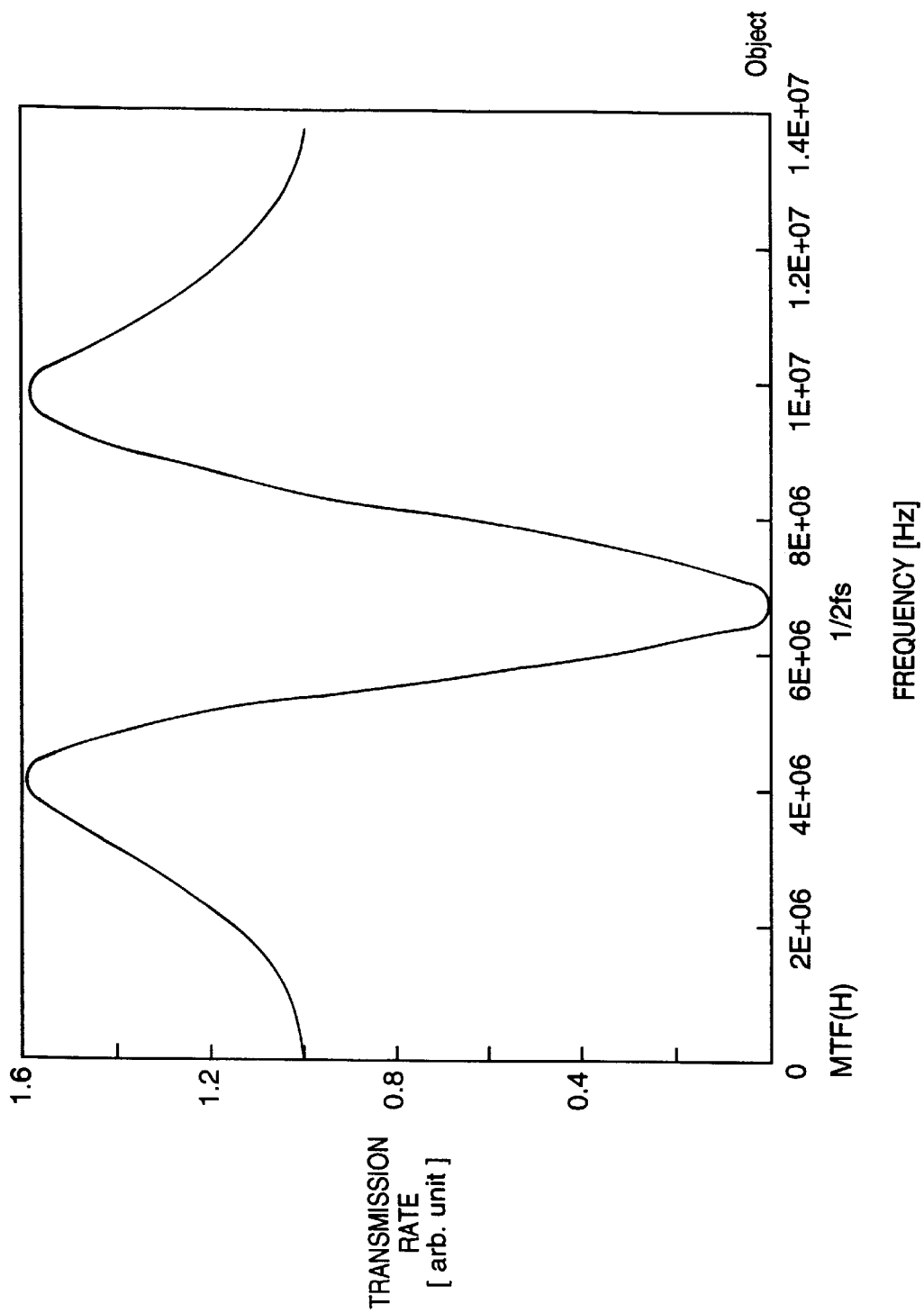
FIG. 11 is a graph showing characteristics of a horizontal low-pass filter shown in FIG. 10.
Figure 19A:
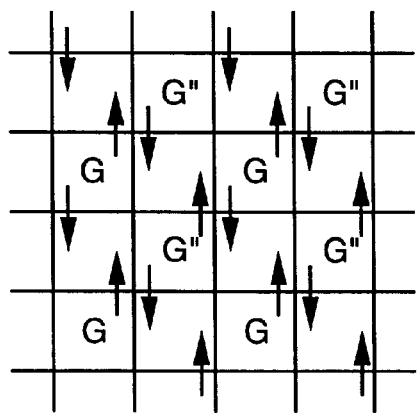
FIG. 19A is a diagram for explaining interpolation of G signals.
Figure 19B:
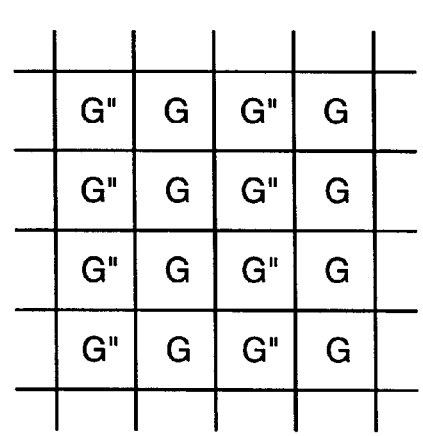
FIG. 19B is a diagram for explaining a variation of G signals caused by a variation in amplification characteristic between AGCS.

The G signal from the color separator 601 is inputted to the H-LPF 610 having the transmission characteristics shown in FIG. 11, for example, and signal components having Nyquist frequency in the horizontal direction, i.e., ½ sampling frequency (½ fs) is trapped. When a gain is given to the AGCs 241 and 242, they amplify the image signals with the designated gain. However, as described above, although the same gain is designated to the AGCs 241 and 242, output levels in odd and even scan lines differ because of the variation in characteristic of the AGCs. As a result, when an object of a uniform color (e.g., a white paper) is sensed, a variation in output signal level of the two AGCs causes vertical stripes which alternatively have different output levels on a display as shown in FIG. 19B, which considerably deteriorates the image quality.

However, a horizontal frequency component of ½ fs in the horizontal direction of the G signal is trapped by the H-LPF 610, therefore, output level difference between odd and even vertical lines which is caused by a variation of luminance signals having Nyquist frequency in the horizontal direction, i.e., ½ fs, is compensated.

Thereafter, the signal G filtered by the H-LPF 602 is branched into four lines. The two lines of these four lines of G signal are respectively input to a V-HPF 603 and a H-HPF 604, and a vertical and horizontal edge signals are extracted. Then, these vertical and horizontal edge signals are added, and the G signal from the H-LPF 610 is further added, thereby the edge-enhanced signal G is generated. The edge-enhanced signal G obtained as above is processed by a γ processing circuit 606, then sent to a color conversion matrix circuit 607. The G-low, B-low and R-low signals are white-balanced by the white balance circuit 605, processed by the γ processing circuits 606, then sent to the color conversion matrix circuit 607.

The color conversion matrix circuit 607 performs linear matrix operation and RGB-YCbCr conversion upon reception of G, G-low, B-low and R-low signals. The luminance signal Y outputted from the color conversion matrix circuit 607 is outputted from an output terminal 609Y. Regarding the color difference signals Cb and Cr, they are performed with band-width compression and dot sequential operation by a dot sequential circuit 608, then outputted from an output terminal 609C.

If the obtained image is dark when sensing an object of low luminance, the gain information c1 obtained on the basis of the signal G which has passed through a H-LPF 610 is transmitted to the microcomputer 208 in order to appropriately amplify the image signals.

The microcomputer 208 determines the gain for the AGCs 241 and 242 on the basis of the data received from the camera processing circuit 206, then outputs a control signal c2. The AGCs 241 and 242 adjust themselves to the desired gain in response to the reception of the control signal c2.

When the gain is given, the AGCs 241 and 242 amplify image signals with the gain. Since operation of each of AGCs 241 and 242 usually differs from each other, the amplified image signals may have different signal levels when the same gain is given. However, with the aforesaid configuration, even through the output signal levels from the AGCs 241 and 242 differ from each other, frequency components of ½ fs are trapped by the H-LPF 602 from the G signal, thereby it is possible to prevent deterioration of image quality due to a variation in output level of image signals, and possible to obtain an image of good quality.

As described above, by designing the H-LPF 602 so as to trap frequency components in the horizontal direction which are caused by a variation in characteristic of the AGCs 241 and 242, it is possible to effectively remove the variation in output levels of the AGCs 241 and 242 without adding any extra hardware configuration.

<Third Embodiment>

Next, a third embodiment of the present invention will be explained with reference to accompanying drawings. Note, an image sensing apparatus according to the third embodiment has the same configuration as that described in the second embodiment except the camera processing circuit 206' (FIG. 12), thus explanations of the same units and elements as those described in the second embodiment are omitted. The camera processing circuit 206' according to the third embodiment will be explained in follow.

Figure 12:
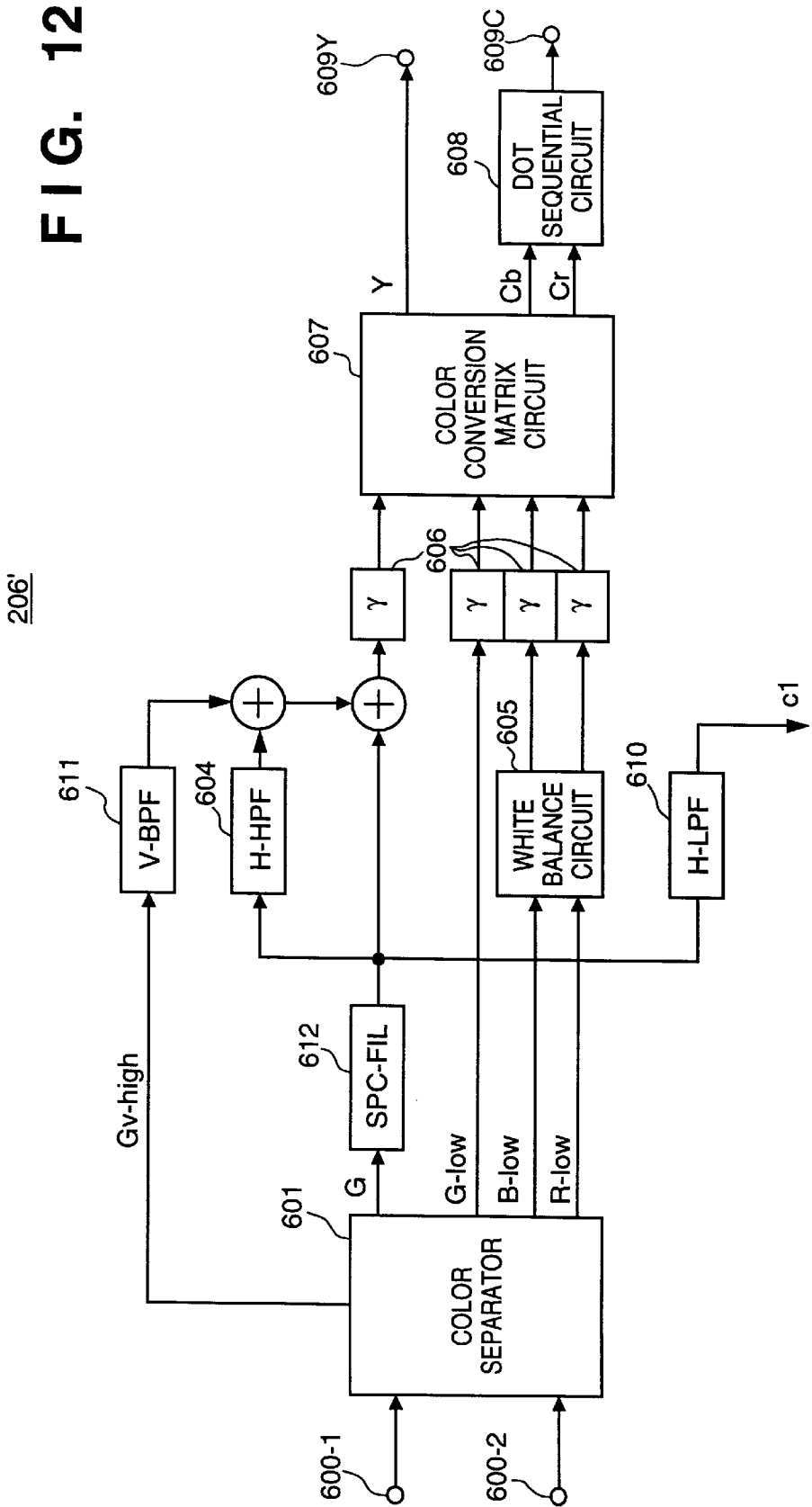
FIG. 12 is a block diagram illustrating a camera processing circuit according to a third embodiment of the present invention.

The first and second digital image signals obtained as described above with reference to FIG. 9 are transmitted to the camera processing circuit 206' shown in FIG. 12 according to the third embodiment. In the camera processing circuit 206', image signals outputted from the channels ch1 and ch2 of the non-interlace scanning type image sensing device 201 are inputted to the color separator 601 through the input terminals 600-1 and 600-2, respectively.

Figure 18A:
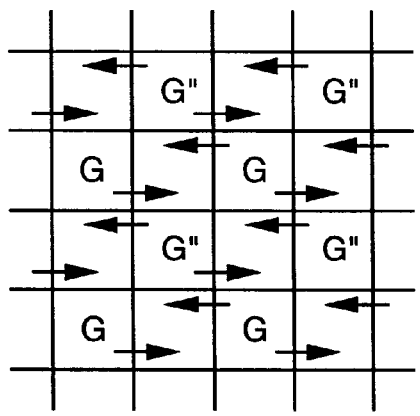
FIG. 18A is a diagram for explaining interpolation of G signals.
Figure 20:
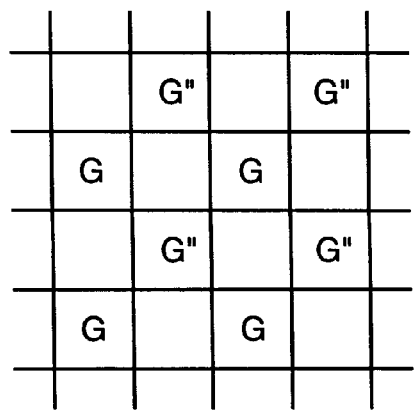
FIG. 20 is a diagram for explaining interpolation of G signals.

The color separator 601 generates signals G-low, B-low and R-low on the basis of data of G pixels, B pixels and R pixels sequentially inputted in accordance with the pixel arrangement as shown in FIG. 2 by performing interpolation described in the second embodiment. Further, in the third embodiment, the G signal is obtained by interpolating 0 in non-G pixels (zero interpolation) as shown in FIG. 20. Furthermore, a Gv-high signal for obtaining a vertical edge signal is interpolated in the vertical direction as shown in FIG. 18A and outputted.

The G signal obtained as above is inputted to the SPC-FIL 612. FIG. 14 shows a graph showing the spatial frequency characteristics of the SPC-FIL 612. In FIG. 14, x axis denotes spatial frequency in the horizontal direction, y axis denotes spatial frequency in the vertical direction, and z axis denotes response in arbitrary unit. As shown in FIG. 14, the SPC-FIL 612 traps frequency components of Nyquist frequencies in the horizontal, vertical and oblique directions (i.e., ½ (fs-h), ½ (fs-v), ½ (fs-o)).

The G signal inputted from the color separator 601 is processed so that components having Nyquist frequencies in the horizontal, vertical and oblique directions are removed by the SPC-FIL 612. As a result, moiré of the luminance signals which conventionally appears in the horizontal, vertical and oblique directions can be removed.

Figures 15A, 15B, 15C:
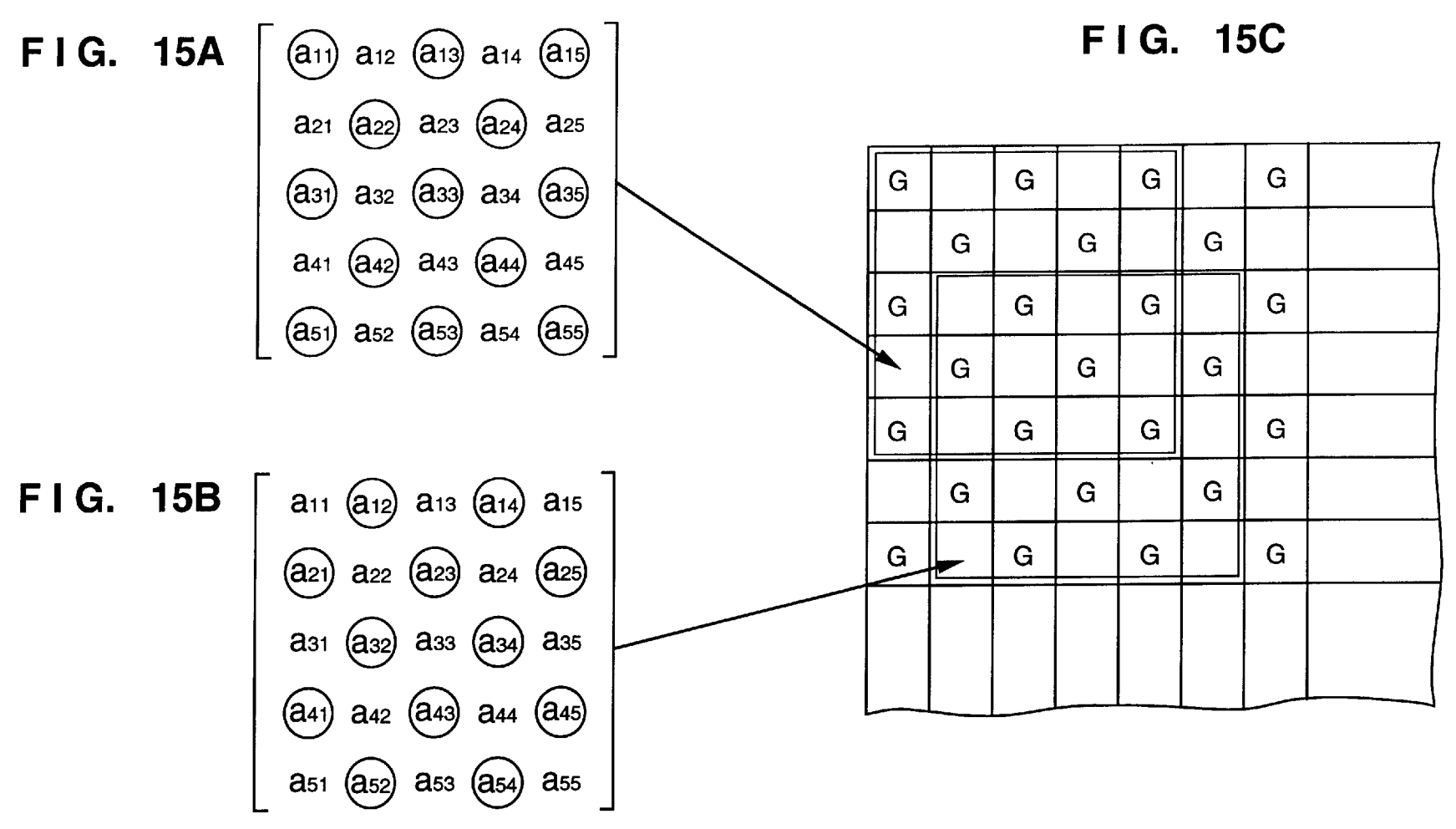

In the SPC-FIL 612, a 5×5 matrix as shown in FIG. 15A, for example, is applied to data of a 5×5 pixel matrix having a pixel of interest at its center to obtain a value of the pixel of interest. Note, since the zero interpolation is performed by the color separator 601 for obtaining the G signal in this case, G pixel values and the value 0 (shown as "blanks") appear in a check pattern as shown in FIG. 15C. Therefore, in a case where the pixel of interest in the matrix shown in FIG. 15C is a G pixel, the coefficients indicated by ○ in FIG. 15A (i.e., $a_{11}, a_{13}, \ldots, a_{55}$) are applied to G pixel values, and other coefficients apply to pixel values assigned to 0. In other words, the coefficients which are not indicated by ○ in FIG. 15A (i.e., $a_{12}, a_{14}, \ldots, a_{54}$) are not used in practice. Whereas, in a case where the pixel assigned to ○ is the pixel of interest, the coefficients indicated by ● in FIG. 15B (i.e., $a_{12}, a_{14}, \ldots, a_{54}$) are applied to G pixel values, and other coefficients apply to pixel values assigned to 0. In other words, the coefficients which are not indicated by ○ in FIG. 15B (i.e., $a_{11}, a_{13}, \ldots, a_{55}$) are not used in practice. It should be noted that, in the first embodiment, the SPC-FIL 612 is designed so that the sum of the coefficients indicated by ○ in FIG. 15A equals to the sum of the coefficients indicated by ○ in FIG. 15B. In other words, the SPC-FIL 612 is designed so that the matrix sums of two sets of complementary coefficients taken in check pattern order from the coefficient matrix of the SPC-FIL 612 are the same.

Figure 18B:
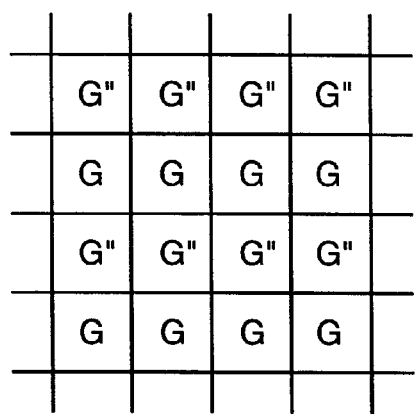
FIG. 18B is a diagram for explaining a variation of G signals caused by a variation in amplification characteristic between AGCS.

After gains are assigned to the AGCs 241 and 242, the AGCs 241 and 242 amplify image signals with the designated gains. However, since the characteristics of the AGCs 241 and 242 differ from each other, levels of amplified image signals may differ even though the same gains are designated. As a result, signals of odd and even scan lines, signals of odd and even vertical lines may have different output levels. Therefore, when a uniform color (e.g., a white paper) is sensed, for example, variation in amplification characteristic between the AGCs 241 and 242 may clearly appear in horizontal or vertical stripes in a displayed image as shown in FIG. 18B or 19B. Thus, quality of an image drops considerably. Especially, this variation appears clearly as a variation of luminance signals having Nyquist frequency.

However, according to the first embodiment, since frequency component of ½(fs-v) of the G signal in the vertical direction is trapped by the SPC-FIL 612, output level difference between odd and even vertical lines which appears as a variation of luminance signals having Nyquist frequency in the vertical direction is removed. Furthermore, since the frequency component of ½(fs-h) of the G signal in the horizontal direction is also trapped by the SPC-FIL 612, output level difference between odd and even vertical lines which appears as a variation of luminance signals having Nyquist frequency in the horizontal direction is removed. Similarly, since the frequency component of ½(fs-o) of the G signal in the oblique direction is trapped by the SPC-FIL 612, too, moiré appears as a variation of luminance signals having Nyquist frequency in the oblique direction is also removed.

Figure 13:
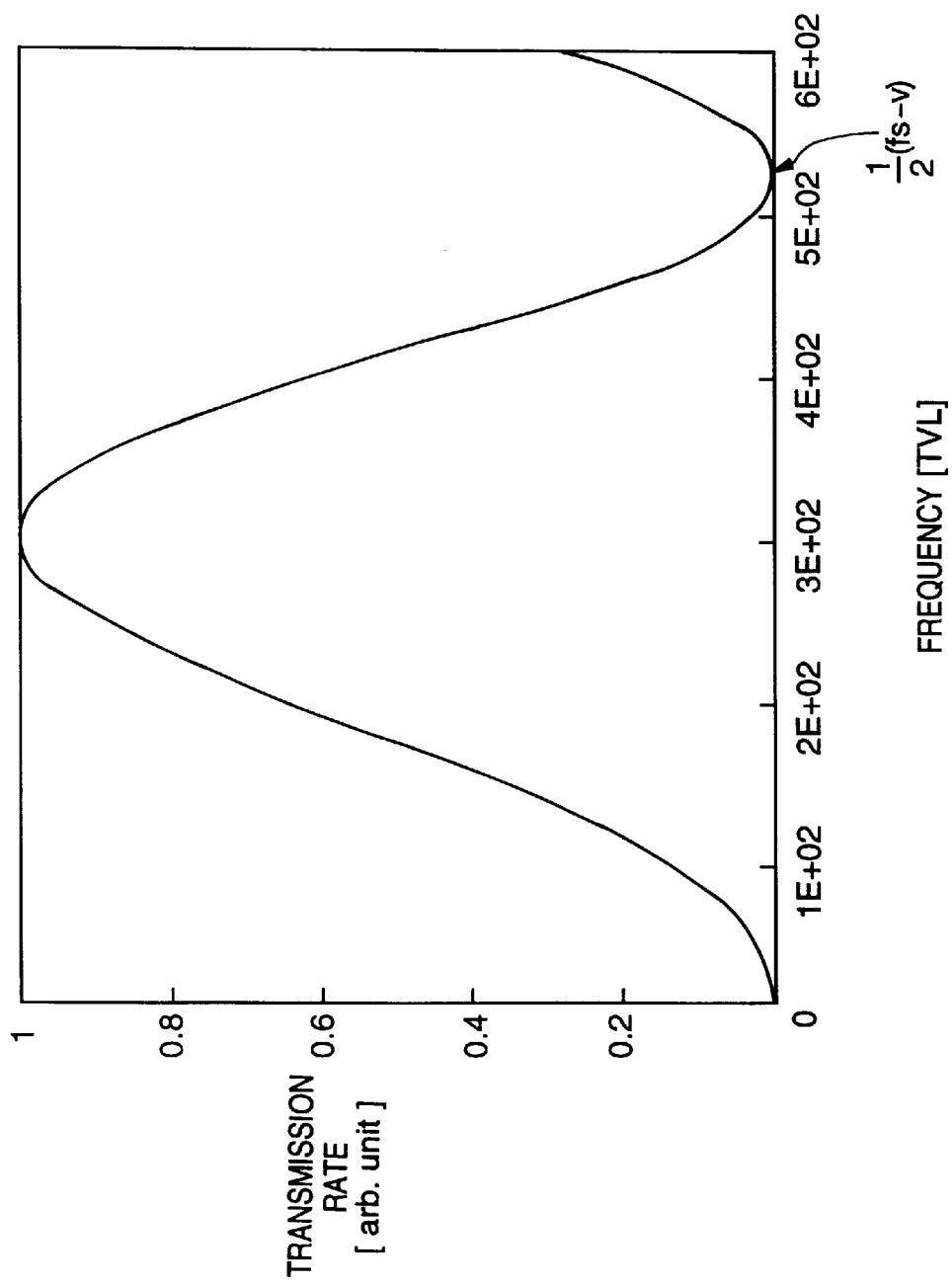
FIG. 13 is a graph showing characteristics of a vertical band-pass filter shown in FIG. 12.

The G signal processed by the SPC-FIL 612 is branched into three lines. The G signal in one line is inputted to the H-HPF 604 where a horizontal edge signal is extracted. Further, the vertical edge signal Gv-high is inputted to a vertical band-pass filter (V-BPF) 611 having transmission characteristics as shown in FIG. 13, where a vertical edge signal is extracted and its frequency components of ½(fs-v) are trapped. Then, after the horizontal and vertical edge signals are added, the G signal from the SPC-FIL 612 is further added, thereby generating an edge enhanced G signal.

The edge enhanced G signal processed as above is further processed by the γ processing circuit 606, then transferred to the color conversion matrix circuit 607. G-low, B-low and R-low signals are adjusted by white balance operation by the white balance circuit 605, processed by the γ processing circuits 606, then transferred to the color conversion matrix circuit 607.

The color conversion matrix circuit 607 performs linear matrix operation and RGB-YCbCr conversion upon reception of G, G-low, B-low and R-low signals. The luminance signal Y outputted from the color conversion matrix circuit 607 is outputted from the output terminal 609Y. Regarding the color difference signals Cb and Cr, they are performed with band-width compression and dot sequential operation by a dot sequential circuit 608, then outputted from the output terminal 609C.

If the obtained image is dark when sensing an object of low luminance, the gain information c1 obtained on the basis of the signal G which has passed through a H-LPF 610 is transmitted to the microcomputer 208 in order to appropriately amplify the image signals.

The microcomputer 208 determines the gain for the AGCs 241 and 242 on the basis of the data received from the camera processing circuit 206, then outputs a control signal c2. The AGCs 241 and 242 adjust themselves to the desired gain in response to the reception of the control signal c2.

When the gain is given, the AGCs 241 and 242 amplifies image signals with the predetermined gain. Since operation of each AGCs 241 and 242 usually differ from each other, the amplified image signals may have different signal levels when the same gain is designated. However, with the aforesaid configuration, even through the output signal levels from the AGCs 241 and 242 differ from each other, ½(fs-h), ½(fs-v) and ½(fs-o) frequency components of the G signal are trapped by the SPC-FIL 612, thereby it is possible to prevent deterioration of the quality of an image due to a variation in level of image signals, and possible to obtain an image of good quality.

According to the third embodiment as described above, by designing the SPC-FIL 612 so as to trap frequency components in the vertical direction, i.e., ½(fs-v) and frequency components in the horizontal direction, i.e., ½(fs-h) which are caused by a variation in characteristic of the AGCs 241 and 242, it is possible to effectively remove the variation in output levels of the AGCs 241 and 242 without adding any extra hardware configuration.

Furthermore, by effectively restraining luminance carrier component in the oblique direction by using a two-dimensional filter, it is possible to obtain a sharp image without narrowing a bandwidth of luminance signals.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:

an image sensing device having a plurality of output terminals and sequentially outputting image signals of all the pixels of said image sensing device from the plurality of output terminals;

a plurality of amplification means for amplifying the image signals outputted from the plurality of output terminals;

color signal generating means for generating at least one color signal from the image signals amplified by said plurality of amplification means;

a level detector for detecting levels of frequency components having a frequency of half the sampling frequency of said color signal generated by said color signal generating means; and gain control means for controlling relative gain between said plurality of amplification means so as to suppress the levels of frequency components having a frequency of half the sampling frequency of said color signal.

2. The image sensing apparatus according to claim 1, wherein said image sensing device includes a non-interlace scanning type charge coupled device.

3. The image sensing apparatus according to claim 1, wherein said image sensing device outputs image signals of all the pixels in one field period in the NTSC standard.

4. The image sensing apparatus according to claim 1, wherein said image sensing device outputs image signals of all the pixels in one field period in the PAL standard.

5. The image sensing apparatus according to claim 1, wherein a color filter is provided in front of said image sensing device.

6. The image sensing apparatus according to claim 5 further comprising signal processing means for processing the image signals outputted from said image sensing device and outputting a luminance signal and a color difference signal.

7. The image sensing apparatus according to claim 5, wherein said color filter is an RGB color filter of Bayer arrangement.

8. An image sensing method comprising:

an image signal output step of sequentially outputting image signals of all pixels of an image sensing device from a plurality of output terminals;

an amplification step of amplifying the image signals outputted from the plurality of output terminals by using a plurality of amplification means;

a color signal generating step of generating at least one color signal from said image signals amplified in said amplification step;

a level detecting step of detecting levels of frequency components having a frequency of half the sampling frequency of said color signal generated in said color signal composing step; and a gain control step of controlling relative gain between said plurality of amplification means so as to suppress the levels of frequency components having a frequency of half the sampling frequency of said color signal.

9. The image sensing method according to claim 8, wherein, at said image signal output step, image signals of all the pixels are outputted in one field period in the NTSC standard.

10. The image sensing method according to claim 8, wherein, at said image signal output step, image signals of all the pixels are outputted in one field period in the PAL standard.

11. The image sensing method according to claim 8 further comprising a signal processing step of processing the image signals outputted at said image signal output step and outputting a luminance signal and a color difference signal.

* * * * *

UNITED STATES PATENT AND TRADEMARK OFFICE
CERTIFICATE OF CORRECTION

PATENT NO. : 6,147,707
DATED : November 14, 2000
INVENTOR(S) : Ken Terasawa et al.

It is certified that error appears in the above-identified patent and that said Letters Patent is hereby corrected as shown below:

Column 4,
Line 50, "AGCS;" should read -- AGCs; --
Line 55, "AGCS;" should read -- AGCs; --
Line 60, "AGCS;" should read -- AGCs; --

Column 8,
Line 58, "GCs" should read -- AGCs --

Signed and Sealed this

Twelfth Day of March, 2002

Attest:

JAMES E. ROGAN
Attesting Officer    Director of the United States Patent and Trademark Office